(12) United States Patent
Noda

(10) Patent No.: US 12,292,425 B2
(45) Date of Patent: May 6, 2025

(54) PEAK TRACKING DEVICE, PEAK TRACKING METHOD AND NON-TRANSITORY COMPUTER READABLE MEDIUM STORING PEAK TRACKING PROGRAM

(71) Applicant: Shimadzu Corporation, Kyoto (JP)

(72) Inventor: Akira Noda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 20 days.

(21) Appl. No.: 17/910,501

(22) PCT Filed: Feb. 22, 2021

(86) PCT No.: PCT/JP2021/006657
§ 371 (c)(1),
(2) Date: Sep. 9, 2022

(87) PCT Pub. No.: WO2021/240922
PCT Pub. Date: Dec. 2, 2021

(65) Prior Publication Data
US 2023/0131114 A1    Apr. 27, 2023

(30) Foreign Application Priority Data
May 28, 2020   (JP) ................................ 2020-093336

(51) Int. Cl.
*G01N 30/86*   (2006.01)
*G01N 30/02*   (2006.01)

(52) U.S. Cl.
CPC ... *G01N 30/8631* (2013.01); *G01N 2030/027* (2013.01)

(58) Field of Classification Search
CPC ......... G01N 30/8631; G01N 2030/027; G01N 30/8658; G01N 30/34; G01N 30/88
(Continued)

(56) References Cited

U.S. PATENT DOCUMENTS

| 4,802,102 A | 1/1989 | Lacey |
| 2007/0038041 A1 | 2/2007 | Yang et al. |

(Continued)

FOREIGN PATENT DOCUMENTS

| CN | 101256176 A | 9/2008 |
| EP | 0437829 A1 | 7/1991 |

(Continued)

OTHER PUBLICATIONS

International Search Report for PCT Patent Application No. PCT/JP2021/006657, dated May 11, 2021.
Written Opinion of the International Searching Authority for PCT Patent Application No. PCT/JP2021/006657, May 11, 2021 (English machine translation—partial).
Mitsui, "Determination of Mixing Ratio in Organic Solvent Using Principal Component Score", Bunseki Kagaku vol. 57, No. 10, pp. 811-817, 2008.

(Continued)

*Primary Examiner* — Robert R Raevis
(74) *Attorney, Agent, or Firm* — Muir Patent Law, PLLC

(57) ABSTRACT

A peak tracking device includes a chromatogram acquirer that acquires chromatograms based on measurement data obtained by providing an analysis device with analysis condition data, and a peak associator that associates each peak included in each chromatogram with one another. The peak associator includes a peak spectrum extractor that extracts peak spectral data being a spectrum derived from a peak from measurement spectral data acquired from each measurement data, an orthogonal spectrum extractors that extracts, from the measurement spectral data, spectral data orthogonal to a dominant component among components of the peak spectral data, and a similarity determiner that associates each peak with one another based on similarity of the spectral data extracted from the orthogonal spectrum extractor.

8 Claims, 11 Drawing Sheets

(58) Field of Classification Search
USPC .......... 73/23.22–23.27, 23.35, 23.36, 61.52, 73/61.57; 210/656; 422/70, 89; 702/25, 702/85, 104
See application file for complete search history.

(56) References Cited

U.S. PATENT DOCUMENTS

| | | |
|---|---|---|
| 2010/0123897 A1 | 5/2010 | Yang et al. |
| 2011/0264411 A1 | 10/2011 | Yang et al. |
| 2015/0131098 A1 | 5/2015 | Yang et al. |
| 2019/0011408 A1 | 1/2019 | Noda |

FOREIGN PATENT DOCUMENTS

| | | |
|---|---|---|
| JP | 04-212059 A | 8/1992 |
| JP | 2008-539441 A | 11/2008 |
| WO | 2017119086 A1 | 7/2017 |

OTHER PUBLICATIONS

Molnar et al., "Chromatography Modelling in High Performance Liquid Chromatography Method Development", Chromatography, 2013.

Office Action in the counterpart Japanese patent application (2022-527519) and English machine translation thereof.

Extended European Search Report dated Jun. 5, 2024, in the corresponding European Patent Application No. EP 21814521.7.

Fredriksson M J et al. , "A component tracking algorithm for accelerated and improved liquid chromatography-mass spectrometry method development" Journal of Chromatography; vol. 1217, No. 52 (2010): 8195-8204.

Strasters J K et al. , "Strategy for peak tracking in liquid chromatography on the basis of a multivariate analysis of spectral data" Journal of Chromatography; vol. 499, Jan. 19, 1990 pp. 499-522.

Office Action for corresponding Chinese patent application No. CN 202180036507.0 dated Feb. 21, 2025.

F I G. 1
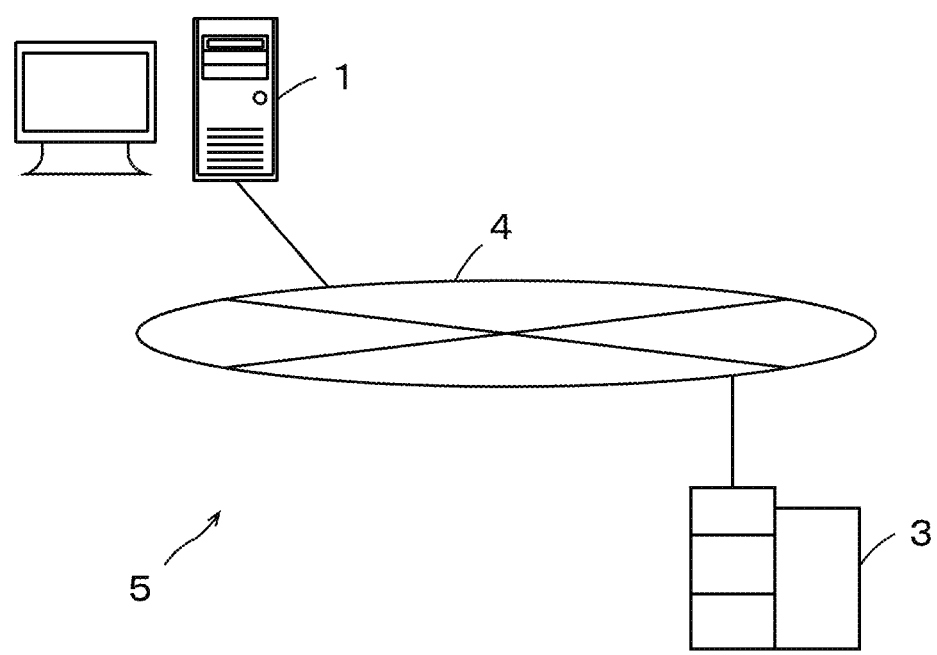

PEAK TRACKING DEVICE, PEAK TRACKING METHOD AND NON-TRANSITORY COMPUTER READABLE MEDIUM STORING PEAK TRACKING PROGRAM

TECHNICAL FIELD

The present invention relates to a peak tracking device, a peak tracking method, and a non-transitory computer readable medium storing a peak tracking program.

BACKGROUND ART

A chromatogram of a sample can be acquired from measurement data acquired in an analysis device. Method scouting for optimizing analysis condition data is carried out for the purpose of increasing resolution of a peak or reducing an analysis time.

When carrying out the method scouting, it is necessary to carry out peak tracking that determines peaks derived from the same substance among different chromatograms obtained based on different analysis condition data. In order to carry out the peak tracking, an area value of a peak, an optical spectrum of the peak, similarity of an MS spectrum of the peak, or the like is used.

Also, when the peak tracking is carried out, a processing of estimating a baseline is carried out in order to extract a true peak from a chromatogram. Patent Document 1 mentioned below discloses a method of obtaining a peak chromatogram by removing an influence exerted by a baseline estimated from a chromatogram.

[Patent Document 1] WO 2017/119086 A1

SUMMARY OF INVENTION

Technical Problem

It is known that in synthesis of medicinal agents with comparatively large molecular weights such as nucleic acid pharmaceutical products and peptide pharmaceutical products, related substances having similar structures are produced as by-products. Such related substances are similar also in optical spectrum and, therefore, in some cases, peak tracking cannot be sufficiently carried out even if optical spectrum similarity is utilized. Also, such related substances are similar also in MS spectrum in many cases and, therefore, an enormous effort is required to search for an m/z value at which a peculiar chromatogram is output for each peak. A combination of correspondence of peaks cannot be focused even by a method using a peak area value in many cases and, therefore, peak tracking cannot be sufficiently carried out in some cases.

Also, peaks of two components accidentally overlap each other in some cases depending on particular analysis condition data. In such cases, peak tracking sometimes cannot be sufficiently carried out by a method of determining only similarity such as simply utilizing correlation function or the like.

An object of the present invention is to provide an effective method for identifying a peak included in a chromatogram.

Solution to Problem

A peak tracking device according to one aspect of the present invention includes a chromatogram acquirer that acquires chromatograms based on a plurality of measurement data obtained by providing an analysis device with a plurality of analysis condition data, a peak associator that associates each peak included in each chromatogram with one another, wherein the peak associator includes a peak spectrum extractor that extracts peak spectral data being a spectrum derived from a peak from measurement spectral data acquired from each measurement data, an orthogonal spectrum extractor that extracts, from the measurement spectral data, spectral data orthogonal to a dominant component among components of the peak spectral data, and a similarity determiner that associates each peak with one another based on similarity of the spectral data extracted from the orthogonal spectrum extractor.

Advantageous Effects of Invention

According to the present invention, an effective method for identifying a peak included in a chromatogram can be provided.

BRIEF DESCRIPTION OF THE DRAWINGS

FIG. 1 is an overview of an analysis system according to the present embodiment.

DESCRIPTION OF EMBODIMENTS

Configurations of a peak tracking device, a peak tracking method, and a peak tracking program according to embodiments of the present invention will now be described with reference to the attached drawings.

(1) Overall Configuration of Analysis System

FIG. 1 is an overview of an analysis system 5 according to the present embodiment. The analysis system 5 includes a computer 1 and a liquid chromatograph 3. The computer 1 and the liquid chromatograph 3 are connected through a network 4. The network 4 is a LAN (Local Area Network), for example.

The computer 1 includes a function that sets analysis conditions in the liquid chromatograph 3, a function that acquires measurement results in the liquid chromatograph 3 and analyzes the measurement results, and the like. A program for controlling the liquid chromatograph 3 is installed in the computer 1.

The liquid chromatograph 3 includes a pump unit, an autosampler unit, a column oven unit, a detector unit and so on. As the detector, a photodiode array (PDA), a mass spectrometer (MS) or the like is used, for example. The liquid chromatograph 3 also includes a system controller. The system controller controls the liquid chromatograph 3 in accordance with a control instruction received from the computer 1 via the network 4. The system controller transmits data of a measurement result of the liquid chromatograph 3 to the computer 1 via the network 4.

(2) Configuration of Computer (Peak Tracking Device)

Figure 2:
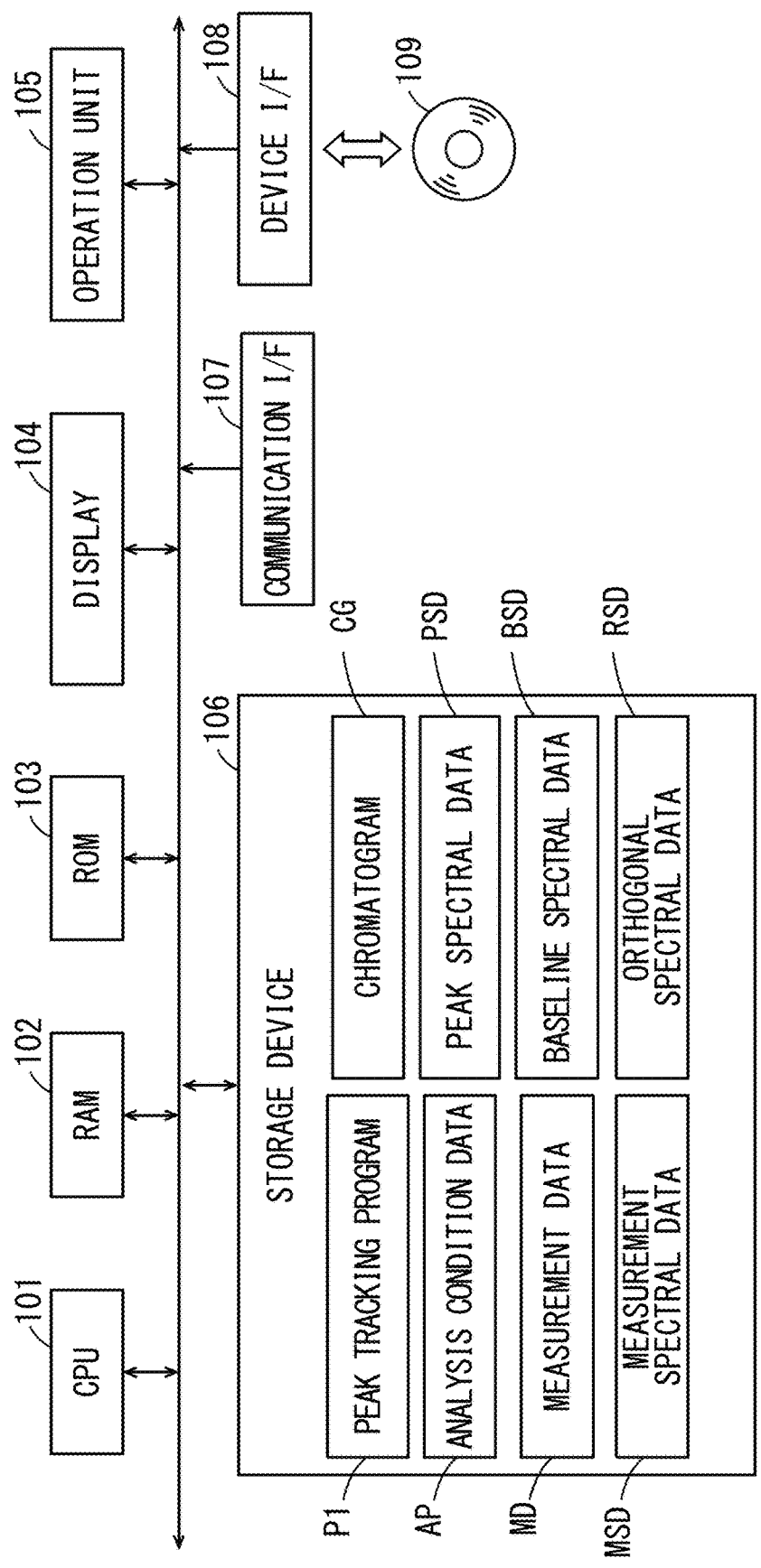
FIG. 2 is a configuration diagram of a computer according to the present embodiment.

FIG. 2 is a configuration diagram of the computer 1. A personal computer is utilized as the computer 1 in the present embodiment. The computer 1 includes a CPU (Central Processing Unit) 101, a RAM (Random Access Memory) 102, a ROM (Read Only Memory) 103, a display 104, an operation unit 105, a storage device 106, a communication interface 107, and a device interface 108.

The CPU 101 controls the computer 1. The RAM 102 is used as a work area when the CPU 101 executes a program. A control program and so on are stored in the ROM 103. The display 104 is a liquid crystal display, for example. The operation unit 105 is a device that receives a user's operation and includes a keyboard, a mouse and so on. The display 104 may be constituted by a touch panel display and may include a function as the operation unit 105. The storage device 106 is a device that stores various programs and data. The storage device 106 is a hard disk, for example. The communication interface 107 is an interface that communicates with another computer and another device. The communication interface 107 is connected to the network 4. The device interface 108 is an interface for accessing various external devices. The CPU 101 can access a storage medium 109 via an external device connected to the device interface 108.

The storage device 106 stores a peak tracking program P1, analysis condition data AP, measurement data MD, measurement spectral data MSD, a chromatogram CG, peak spectral data PSD, baseline spectral data BSD, and orthogonal spectral data RSD. The peak tracking program P1 is a program for controlling the liquid chromatograph 3. The peak tracking program P1 includes a function that sets analysis conditions in the liquid chromatograph 3, a function that acquires a measurement result from the liquid chromatograph 3 and analyzes the measurement result such as producing a chromatogram CG, and other functions.

The analysis condition data AP is data in which analysis conditions to be set in the liquid chromatograph 3 are described, and includes a plurality of analysis parameters. The measurement data MD is data of a measurement result acquired from the liquid chromatograph 3 based on the analysis condition data AP. The measurement data MD is a three-dimensional chromatogram having three dimensions of time, wavelength and absorbance (signal intensity). The measurement spectral data MSD is absorbance data in a wavelength direction extracted as to a specific measurement time from the measurement data MD, which is the three-dimensional chromatogram. The chromatogram CG is absorbance data in a time direction extracted as to a specific wavelength from the measurement data MD, which is the three-dimensional chromatogram.

The peak spectral data PSD is data of a spectral component derived from a peak that is extracted from the measurement spectral data MSD. The baseline spectral data BSD is data of a spectral component derived from a baseline that is extracted from the measurement spectral data MSD. The orthogonal spectral data RSD is spectral data extracted from the measurement spectral data MSD, and is a component orthogonal to a dominant component among components of the peak spectral data PSD.

Figure 3:
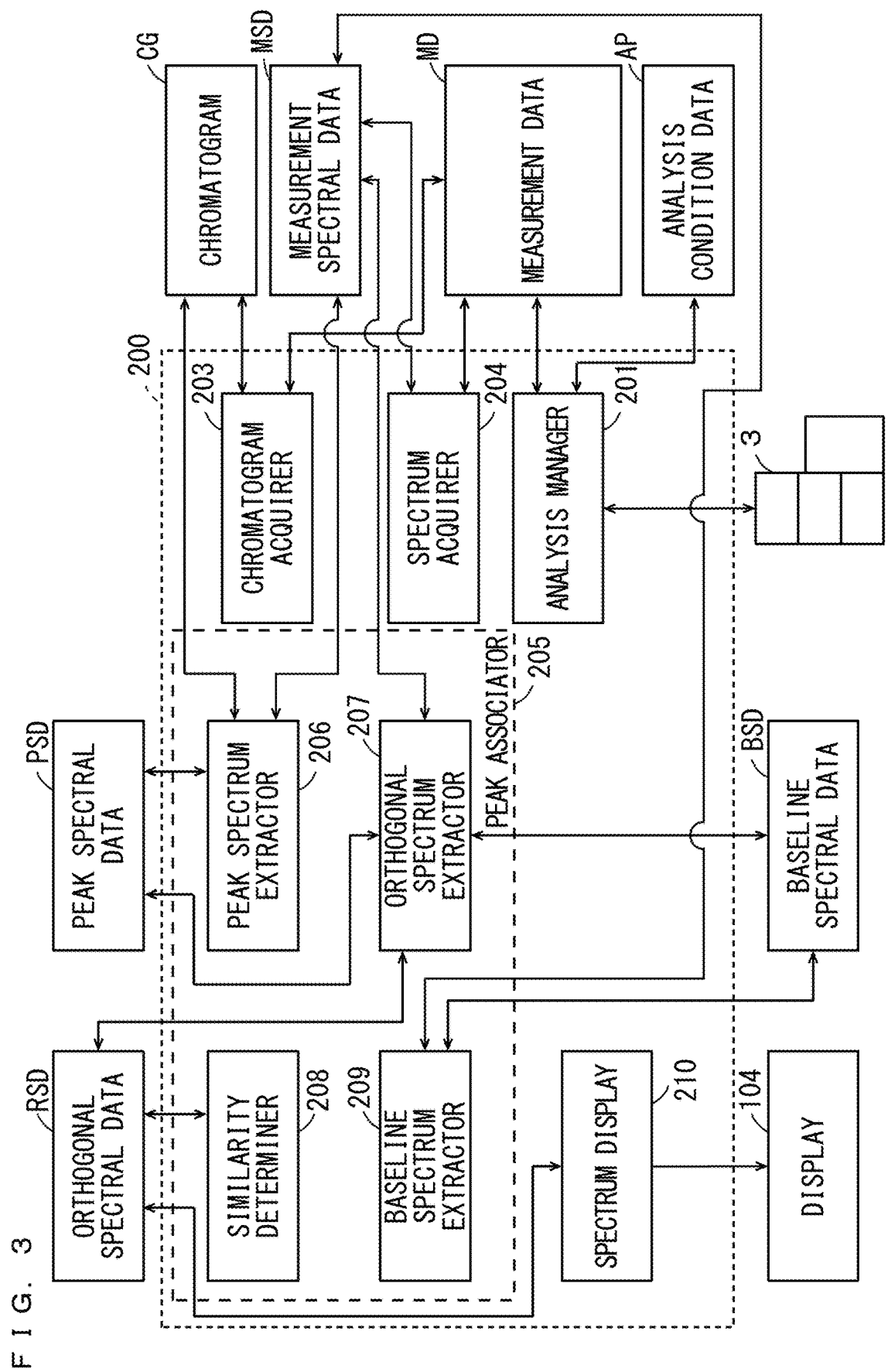
FIG. 3 is a functional block diagram of the computer according to the present embodiment.

FIG. 3 is a functional block diagram of the computer 1. A controller 200 is a function unit that is implemented by the CPU 101 using the RAM 102 as a work area and executing the peak tracking program P1. The controller 200 includes an analysis manager 201, a chromatogram acquirer 203, a spectrum acquirer 204, a peak associator 205, and a spectrum display 210.

The analysis manager 201 controls the liquid chromatograph 3. The analysis manager 201 instructs the liquid chromatograph 3 to perform an analysis processing in response to a user's instructions to set analysis condition data AP and to start the analysis processing. The user sets combinations of set values of analysis parameters such as solvent concentration, solvent mixture ratio, gradient initial value, gradient condition, and column temperature as analysis conditions. The user sets a plurality of sets of the combinations of these analysis parameters. For instance, the user sets the combination of the analysis parameters, in which the solvent concentration is gradually changed, the combination of the analysis parameters, in which the column temperature is gradually changed, and the like as the analysis conditions. The user creates a plurality of analysis condition data AP in this way and carries out the analysis processing on the same sample based on the plurality of analysis condition data AP.

The analysis manager 201 also acquires the measurement data MD being the three-dimensional chromatogram from the liquid chromatograph 3. As described above, the user carries out the analysis processing based on the plurality of analysis condition data AP. The analysis manager 201 acquires a plurality of measurement data MD corresponding to the plurality of analysis condition data AP.

The chromatogram acquirer 203 acquires a chromatogram CG based on the measurement data MD. The chromatogram acquirer 203 saves the acquired chromatogram CG in the storage device 106. As described above, the analysis manager 201 acquires the plurality of measurement data MD corresponding to the plurality of analysis condition data AP. The chromatogram acquirer 203 acquires a plurality of chromatograms CG corresponding to the plurality of measurement data MD.

The spectrum acquirer 204 acquires measurement spectral data MSD based on the measurement data MD. The spectrum acquirer 204 saves the acquired measurement spectral data MSD in the storage device 106.

The peak associator 205 associates peaks with one another among the plurality of chromatograms obtained based on different analysis condition data AP. The peak associator 205 includes a peak spectrum extractor 206, an orthogonal spectrum extractor 207, a similarity determiner 208, and a baseline spectrum extractor 209 as shown in FIG. 3.

The peak spectrum extractor 206 extracts the peak spectral data PSD, which is the spectral component derived from a peak from the measurement spectral data MSD. The orthogonal spectrum extractor 207 extracts orthogonal spectral data RSD from the measurement spectral data MSD. The orthogonal spectral data RSD is data of a component that is extracted from the measurement spectral data MSD and is orthogonal to a dominant component among components of the peak spectral data PSD. Also, the orthogonal spectral data RSD is data of a component that is extracted from the measurement spectral data MSD and is orthogonal to the baseline spectral data BSD. The similarity determiner 208 determines similarity of peaks included in the plurality of chromatograms CG based on the orthogonal spectral data RSD. The baseline spectrum extractor 209 extracts baseline spectral data BSD which is a component derived from a baseline from the measurement spectral data MSD.

The spectrum display 210 displays dimensionally contracted orthogonal spectral data RSD on the display 104. Specifically, the spectrum display 210 displays on the display 104 a diagram in which the chromatograms at the respective wavelengths of the orthogonal spectral data extracted by the orthogonal spectrum extractor 207 are overlapped with one another.

Figure 4:
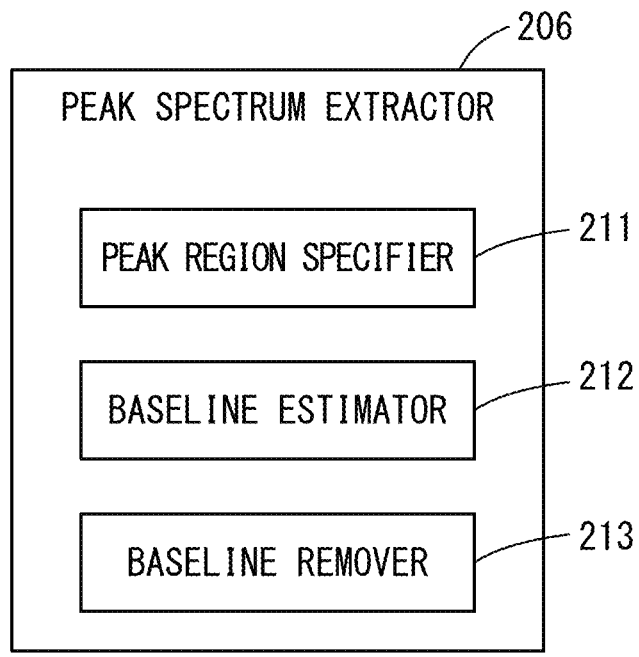
FIG. 4 is a functional block diagram showing the configuration of a peak spectrum extractor.

FIG. 4 is a functional block diagram of the peak spectrum extractor 206. The peak spectrum extractor 206 includes a peak region specifier 211, a baseline estimator 212, and a baseline remover 213. The peak region specifier 211 specifies a peak start point and a peak end point of a peak in a retention time direction in a chromatogram CG. The baseline estimator 212 estimates a baseline component in the chromatogram CG. The baseline remover 213 removes the baseline component from the measurement spectral data MSD.

Figure 5:
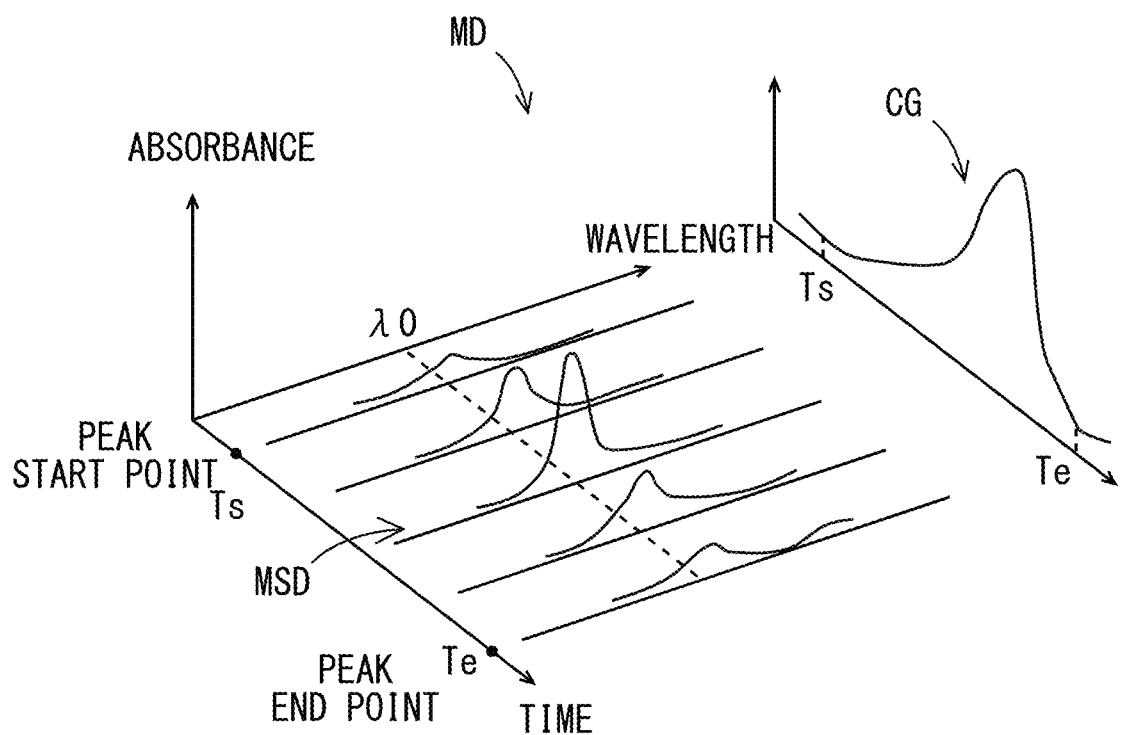
FIG. 5 is a diagram showing measurement spectral data and a chromatogram.

FIG. 5 is a diagram showing measurement data MD. The measurement data MD is a three-dimensional chromatogram data having three axes of time, wavelength and absorbance (signal intensity) as described above. As shown in FIG. 5, the measurement spectral data MSD can be extracted by fixing a measurement time of the measurement data MD. A plurality of the measurement spectral data MSD are extracted in the time direction. A chromatogram CG can be extracted by fixing a wavelength with respect to the plurality of measurement spectral data MSD in the time direction. The chromatogram CG shown in FIG. 5 indicates a chromatogram CG at a wavelength λ0. A peak in the chromatogram CG has a width in the time direction from a peak start point Ts to a peak end point Te.

Figure 6:
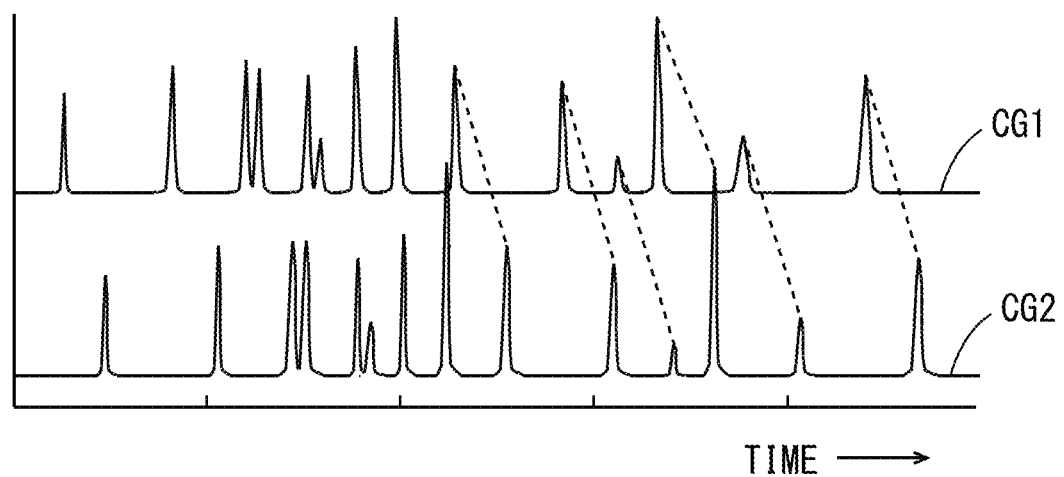
FIG. 6 is a diagram showing chromatograms obtained from different analysis condition data.

FIG. 6 is a diagram showing two chromatograms CG1, CG2 obtained based on two different analysis condition data AP. The chromatograms CG1, CG2 are acquired based on the measurement data MD obtained with respect to the same sample. As can be seen with reference to FIG. 6, the chromatograms CG1, CG2 are different in retention time of each peak due to the difference of the analysis condition data AP. The peaks connected with the dotted line in FIG. 6 are peaks derived from the same substance. The peak associator 205 associates the peaks included in the chromatograms CG1, CG2.

(3) Peak Tracking Method

Figure 7:
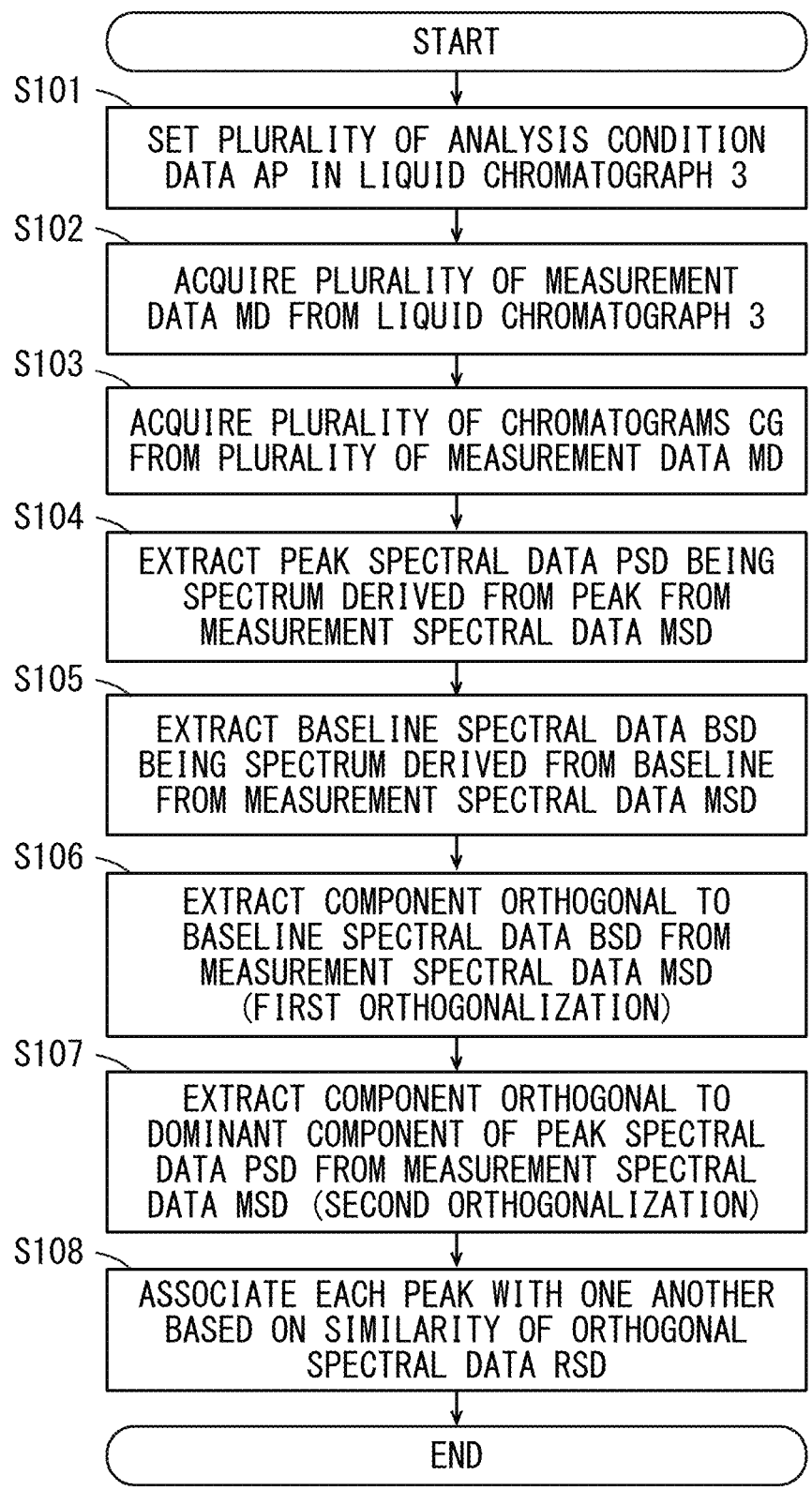
FIG. 7 is a flowchart showing a peak tracking method according to the present embodiment.

A peak tracking method executed in the computer 1 (peak tracking device) according to the present embodiment will now be described. FIG. 7 is a flowchart showing the peak tracking method according to the present embodiment.

Before the processing shown in FIG. 7 is started, a user operates the operation unit 105 to set a plurality of analysis conditions in advance. In response to the setting operation by the user, the analysis manager 201 saves a plurality of analysis condition data AP in the storage device 106.

Then, in step S101 shown in FIG. 7, the analysis manager 201 sets the plurality of analysis condition data AP in the liquid chromatograph 3. Specifically, the analysis manager 201 sets the plurality of analysis condition data AP in the system controller of the liquid chromatograph 3. In response to this, an analysis processing is executed multiple times on the same sample based on the set plurality of analysis condition data AP in the liquid chromatograph 3. A plurality of measurement data MD corresponding to the plurality of analysis condition data AP are acquired in the liquid chromatograph 3.

Then, in step S102, the analysis manager 201 acquires the plurality of measurement data MD from the liquid chromatograph 3. The analysis manager 201 saves the acquired plurality of measurement data MD in the storage device 106.

Then, in step S103, the chromatogram acquirer 203 acquires the plurality of measurement data MD saved in the storage device 106 in step S102 and acquires a plurality of chromatograms CG from the acquired plurality of measurement data MD.

Then, in step S104, the peak spectrum extractor 206 extracts peak spectral data PSD which is a spectrum derived from a peak from measurement spectral data MSD. The processing of extracting the peak spectral data PSD is constituted by three processings: a peak region specifying processing, a baseline estimation processing, and a baseline removing processing.

First, the peak region specifier 211 shown in FIG. 4 executes a peak region specifying processing. The peak region specifier 211 applies a secondary differential filter (Savitzky-Golay) that has a length of around a half width as a window width in a retention time direction to a chromatogram CG. A large part of the baseline included in the chromatogram CG can be approximated by equations up to the first order and therefore can be eliminated by secondary differentiation. Thus, the peak region specifier 211 can specify a peak region. A peak region may be specified by use of a time-invariant filter or transformation such as a highpass filter, a matched filter or wavelet transformation by utilizing that a fluctuation frequency of the peak region is higher than that of the baseline in many cases. Even in the case where a filter processing is applied in the retention time direction in this way, a space per se spanned by a vector of a spectrum derived from each peak is not affected as far as the filter is a linear processing filter. Alternatively, the user may designate a peak start point and a peak end point by use of a peak detection algorithm such as Labsol.

Then, the baseline estimator 212 shown in FIG. 4 executes a baseline estimation processing. The baseline estimator 212 estimates a baseline by linearly interpolating between the peak start point and the peak end point specified by the peak region specifier 211 in the retention time direction. That is, the baseline estimator 212 estimates the baseline by linearly interpolating between bottom points of a peak. Alternatively, in a case where a baseline is predicted to be a curve, the baseline estimator 212 estimates the baseline by curve interpolating between the peak start point and the peak end point specified by the peak region specifier 211 in the retention time direction. That is, the baseline estimator 212 estimates the baseline by curve interpolating between bottom points of a peak.

Finally, the baseline remover 213 shown in FIG. 4 executes a baseline removing processing. Based on the baseline estimated by the baseline estimator 212, the baseline remover 213 subtracts a signal value of the baseline from a signal value of measurement spectral data MSD. With respect to a peak top, for example, the baseline remover 213 subtracts a signal value of a baseline linearly interpolated at a peak top position from the signal value of the measurement spectral data MSD. At that time, the baseline remover 213 subtracts the same signal value at each wavelength (each m/z in a case where the detector is an MS) of the measurement spectral data MSD so as to prevent the spectrum from collapsing.

With the above-described processing, baseline spectral data BSD is removed from the measurement spectral data MSD, and peak spectral data PSD is extracted in the peak spectrum extractor 206. The peak spectrum extractor 206 further performs factorization such as singular value decomposition (principal component analysis) on the peak spectral data PSD. In the present embodiment, a spectral component is focused on a principal component based on a threshold value of a singular value empirically determined. Since an original vector space only needs to be expressed, another factorization such as a spectral analysis can also be utilized. The peak spectrum extractor 206 saves the extracted peak spectral data PSD in the storage device 106.

Then, in step S105, the baseline spectrum extractor 209 extracts baseline spectral data BSD which is a spectrum derived from a baseline from the measurement spectral data MSD. In the present embodiment, the baseline spectrum extractor 209 extracts the baseline spectral data BSD by use of a Savitzky-Golay filter as a lowpass filter. As a method of extracting baseline spectral data BSD, another linear filter can also be used. Also, the baseline spectrum extractor 209 may extract the baseline spectral data BSD by linearly or curve interpolating the peak start point and the peak end point to remove a peak portion. Alternatively, the baseline spectrum extractor 209 may extract the baseline spectral data BSD by applying the lowpass filter after removing the peak portion. The baseline spectrum extractor 209 further performs factorization such as singular value decomposition on the baseline spectral data BSD.

The above-described processing is directed to a method of extracting the baseline spectral data BSD by a signal processing on the measurement spectral data MSD. As another method, the baseline spectral data BSD may be extracted by acquiring the measurement spectral data MSD from a mobile phase or only a pretreatment pharmaceutical product without injecting a sample to be analyzed.

With the above-described processing, the three data: the measurement spectral data MSD, the peak spectral data PSD, and the baseline spectral data BSD are obtained. The peak tracking program P1 of the present embodiment reduces components other than a vector component contributing to peak tracking from those three data by a processing shown below.

First, in step S106, the orthogonal spectrum extractor 207 extracts a component orthogonal to the baseline spectral data BSD from the measurement spectral data MSD. This orthogonalization processing is referred to as a first orthogonalization processing. This processing is an orthogonalization processing aiming to remove a hyperplane component spanned by the baseline spectral data BSD. Thus, the measurement spectral data MSD may be orthogonalized with respect to all factors (all spectrums) of the baseline spectral data BSD obtained by factorization.

Then, in step S107, the orthogonal spectrum extractor 207 performs a second orthogonalization processing on the measurement spectral data MSD subjected to the first orthogonalization processing in step S106. In the second orthogonalization processing, the orthogonal spectrum extractor 207 extracts a component orthogonal to a dominant component among components of the peak spectral data PSD from the measurement spectral data MSD. The component extracted by the first and second orthogonalization processings is orthogonal spectral data RSD. The dominant component of the peak spectral data PSD is, for example, a spectrum to be a first principal component among the spectrums obtained by singular value decomposition (principal component analysis). Alternatively, an average value in the time direction of the peak spectral data PSD can also be used as the dominant component. Since both of the orthogonalization processing in step S106 and the orthogonalization processing in step S107 are linear processings, either orthogonalization processing may be performed first in order.

Then, in step S108, the similarity determiner 208 associates each of peaks with one another based on similarity of the orthogonal spectral data RSD. The similarity determiner 208 determines, for example, similarity of a plurality of peaks obtained from different chromatograms CG based on a degree of correlation of the orthogonal spectral data RSD extracted with respect to each peak. The similarity determiner 208 associates peaks with one another whose degree of correlation exceeds a predetermined threshold value as peaks derived from the same substance.

As such, in the present embodiment, the peak associator 205 includes the peak spectrum extractor 206 that extracts the peak spectral data PSD from the measurement spectral data MSD acquired from the measurement data MD, the orthogonal spectrum extractor 207 that extracts the orthogonal spectral data RSD orthogonal to the dominant component among the components of the peak spectral data PSD from the measurement spectral data MSD, and the similarity determiner 208 that associates the peaks with one another based on the similarity of the orthogonal spectral data RSD. Thus, the computer 1 being the peak tracking device of the present embodiment can determine the similarity of peaks based on the component orthogonal to the principal component except for the common principal component in the time direction.

It is noted that in the above-described processing, the first and second orthogonalization processings are performed to extract the orthogonal spectral data RSD, so that the peaks are more effectively identified. However, the first orthogonalization processing is not indispensable. In a case where an influence exerted by baseline fluctuation is small such as, in particular, in a case where gradient elution is not performed, the orthogonalization by baseline spectral data BSD can be omitted.

FIGS. 8A to 12B are diagrams showing examples of orthogonal spectral data RSD extracted by the orthogonal spectrum extractor 207. FIGS. 8A, 9A, 10A, 11A are diagrams in which the chromatograms at the respective wavelengths of the orthogonal spectral data RSD extracted by the orthogonal spectrum extractor 207 are overlapped. FIGS. 8B, 9B, 10B, 11B are diagrams in which the orthogonal spectral data RSD of FIGS. 8A, 9A, 10A, 11A are dimensionally contracted.

Figure 8A:
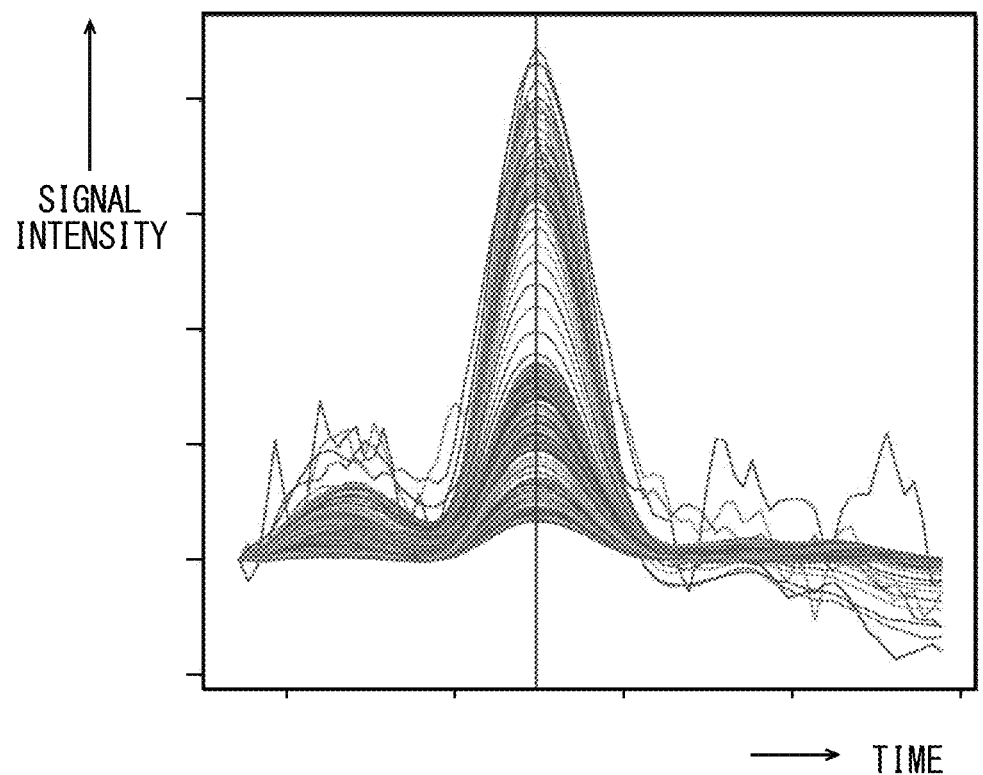
FIGS. 8A and 8B are diagrams in which chromatograms at respective wavelengths of orthogonal spectral data extracted by an orthogonal spectrum extractor are overlapped.
Figure 8B:
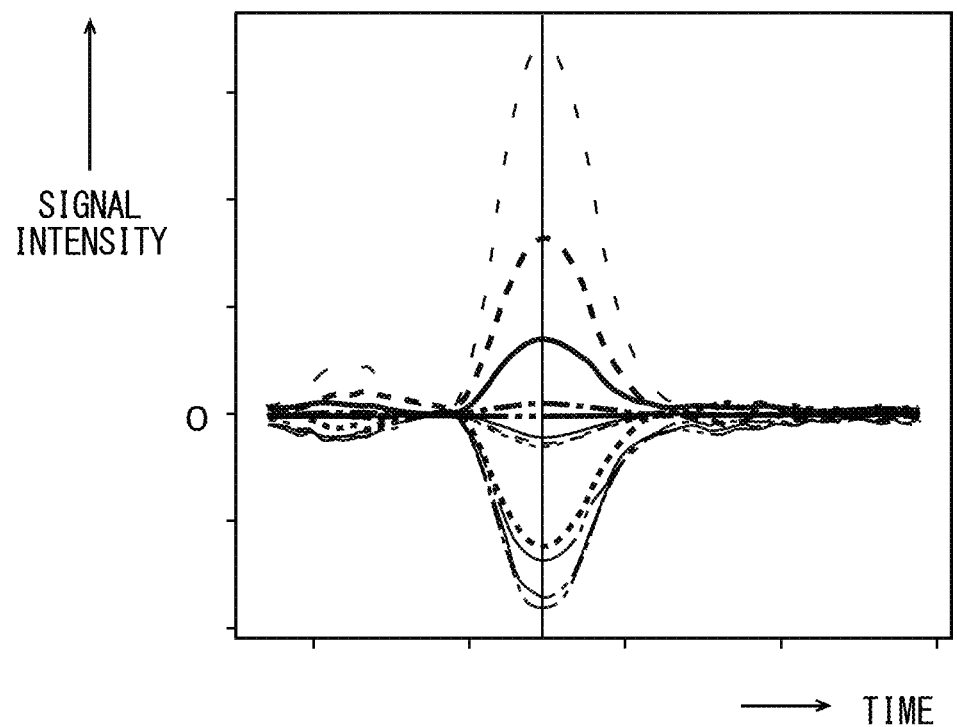
Figure 9A:
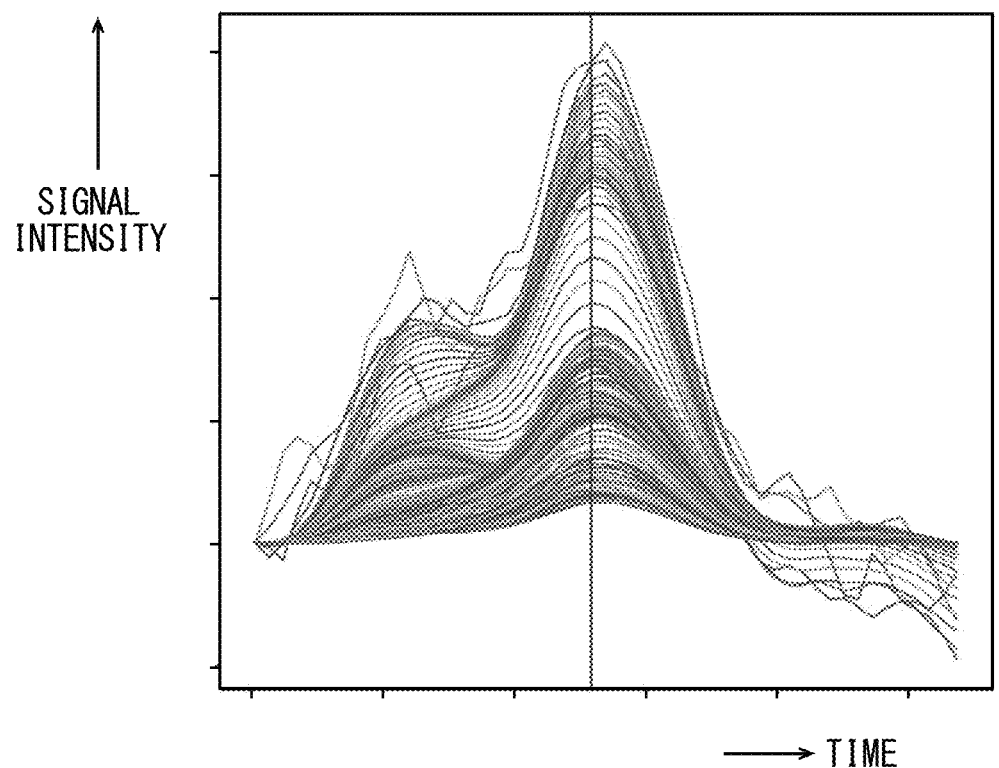
FIGS. 9A and 9B are diagrams in which the chromatograms at the respective wavelengths of the orthogonal spectral data extracted by the orthogonal spectrum extractor are overlapped.
Figure 9B:
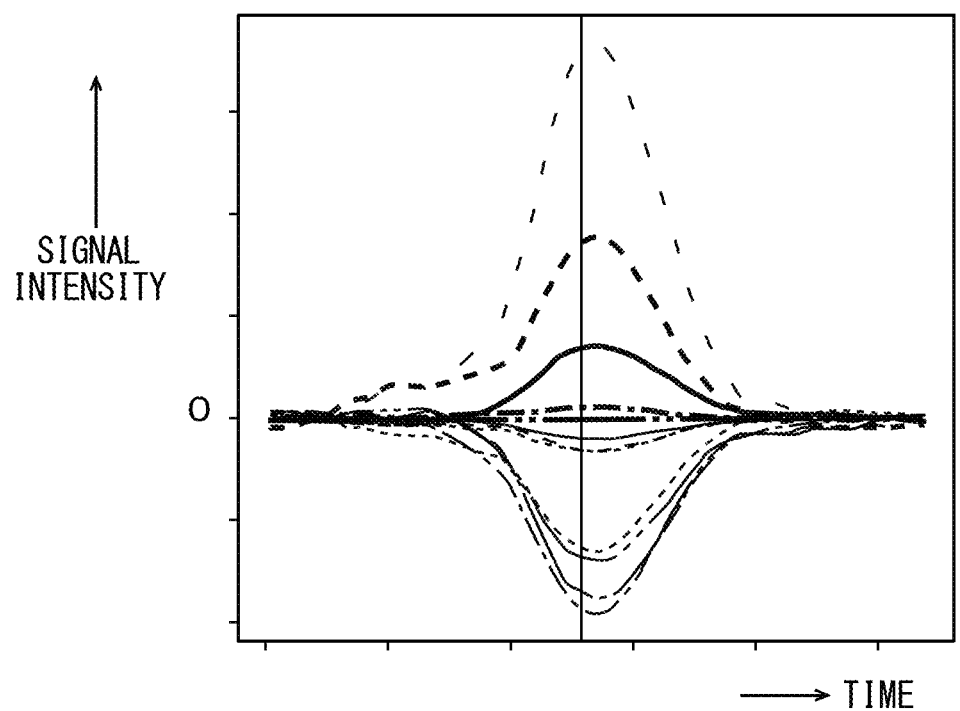

FIGS. 8A to 9B show the orthogonal spectral data RSD with respect to the peaks derived from the same substance. With reference to FIGS. 8A and 9A, although the shapes of the peaks are comparatively approximate, it is difficult to determine whether the peaks are derived from the same substance. However, with reference to dimensionally contracted FIGS. 8B and 9B, it is found that the peaks are highly likely to be derived from the same substance. In FIGS. 8B and 9B, the chromatograms of the orthogonal spectral data RSD are drawn with different types of lines at different wavelengths. With reference to FIGS. 8B and 9B, it is found that the chromatograms at the respective wavelengths are arranged in the same order.

Figure 10A:
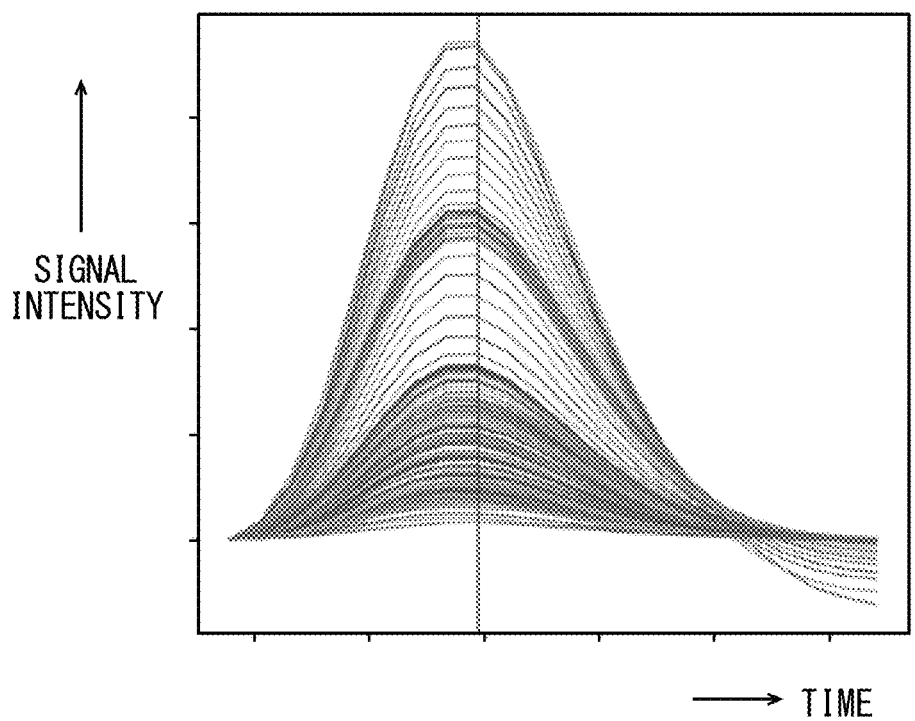
FIGS. 10A and 10B are diagrams in which the chromatograms at the respective wavelengths of the orthogonal spectral data extracted by the orthogonal spectrum extractor are overlapped.
Figure 10B:
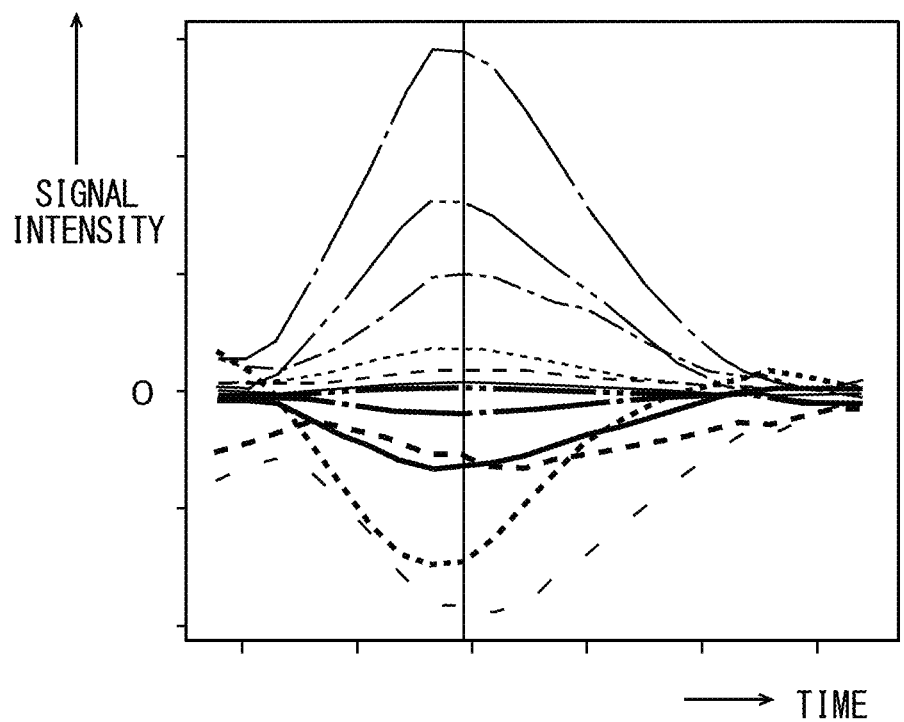
Figure 11A:
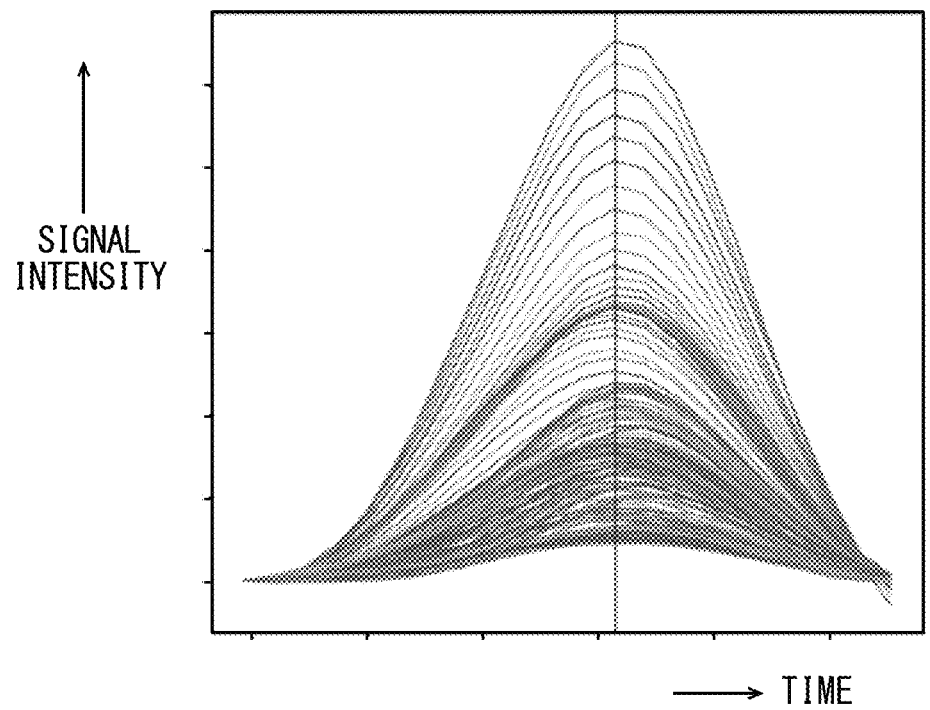
FIGS. 11A and 11B are diagrams in which the chromatograms at the respective wavelengths of the orthogonal spectral data extracted by the orthogonal spectrum extractor are overlapped.
Figure 11B:
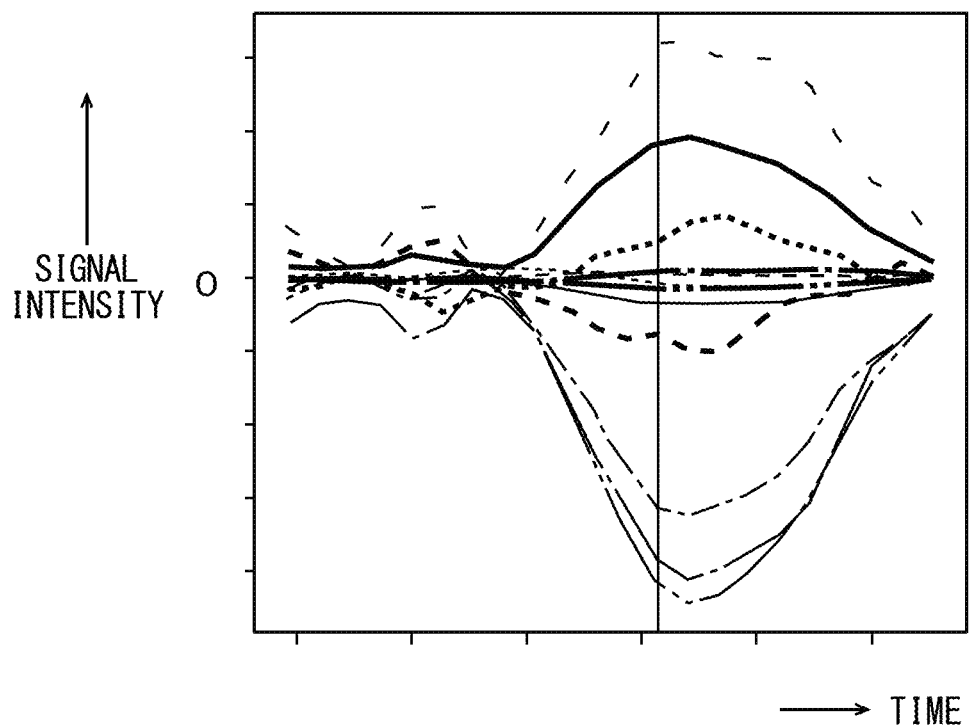

FIGS. 10A to 11B show the orthogonal spectral data RSD with respect to the peaks derived from different substances. With reference to FIGS. 10A and 11A, although the shapes of the peaks are comparatively approximate, it is difficult to determine whether the peaks are derived from the same substance. However, with reference to dimensionally contracted FIGS. 10B and 11B, it is found that the peaks are highly likely to be derived from different substances. In FIGS. 10B and 11B, the chromatograms of the orthogonal spectral data RSD are drawn with different types of lines at respective wavelengths. With reference to FIGS. 10B and 11B, it is found that the chromatograms at the respective wavelengths are arranged in different orders.

In the above-described embodiment, the association of the peaks are evaluated based on the similarity of the orthogonal spectral data RSD. In order to check how robust this similarity is, an SN ratio of the orthogonal spectral data RSD is sometimes intended to be calculated. Alternatively, a user sometimes wishes to visually check validity of the similarity. As such, in the above-described embodiment, dimensionally contracted orthogonal spectral data RSD is utilized as shown below.

The spectrum display 210 shown in FIG. 3 displays dimensionally contracted orthogonal spectral data RSD on the display 104 of the computer 1. That is, the orthogonal spectral data RSD shown in FIGS. 8B, 9B, 10B, 11B (the diagrams in which the chromatograms at respective wavelengths are overlapped) are displayed on the display 104. Thus, the user can evaluate the SN ratio of the chromatograms of the orthogonal spectral data RSD used for the determination of the similarity. The user can easily determine whether meaningful peak tracking that compares spectrums is performed or whether the SN ratio is within the margin of error due to noise. Since the orthogonal spectral data RSD is dimensionally contracted, the user can easily visually check the validity of the similarity. The orthogonal spectral data RSD may be dimensionally contracted by being factorized again; however, it comes to the similar result.

(4) Correspondences Between Constituent Elements in Claims and Parts in Preferred Embodiments In the following paragraphs, non-limiting examples of correspondences between various elements recited in the claims below and those described above with respect to various preferred embodiments of the present invention are explained. In the above-described embodiment, the liquid chromatograph 3 is an example of an analysis device. Also, in the above-described embodiment, the computer 1 is an example of a peak tracking device.

As each of constituent elements recited in the claims, various other elements having configurations or functions described in the claims can be also used.

(5) Other Embodiments (5-1) Omission of Orthogonalization by Peak Spectral Dominant Component In the above-described embodiment, the orthogonal spectrum extractor 207 extracts the orthogonal spectral data RSD by the first and second orthogonalization processings. Here, in a case where a method of cutting out a peak region is used when the baseline spectral data BSD is estimated, a minute peak spectral component is sometimes mixed into the baseline spectral data BSD. In this case, the measurement spectral data MSD is orthogonalized by the baseline spectral data BSD, so that the dominant component of the peak spectral data PSD is also orthogonalized. In such a case, a similar effect to that obtained in a case where both of the first and second orthogonalization processings are executed is revealed by merely executing the first orthogonalization processing. Thus, if the similarity of peaks is equal to or less than a certain threshold value that is empirically determined, the orthogonalization by the dominant component of the peak spectrum can also be omitted.

(5-2) Presentation of Mixing Possibility of Peaks

In some cases, with respect to particular analysis condition data AP, two peaks derived from different substances are accidentally overlapped and output as one peak. The peak tracking method of the present embodiment can provide information for determining mixing possibility also as to mixed peaks. If a peak A (spectrum SA) and a peak B (spectrum SB) are mixed to constitute a peak C, and the peak A and the peak B are completely overlapped, a spectrum SC of the peak C is SC=SA+SB. Even if the peak A and the peak B are not completely coincident with each other, the spectrum SC is expressed by SC=$\alpha$SA+$\beta$SB and should be contained in a space spanned by the spectrums SA, SB.

In order to check the relation of SC=SA+SB, it only needs to be checked whether the sum of an integrated value of orthogonal spectral data RSD of a region of the peak A and an integrated value of orthogonal spectral data RSD of a region of the peak B falls within the margin of error of the value of SC. Thus, information as to peak mixing possibility can be obtained.

Figure 12A:
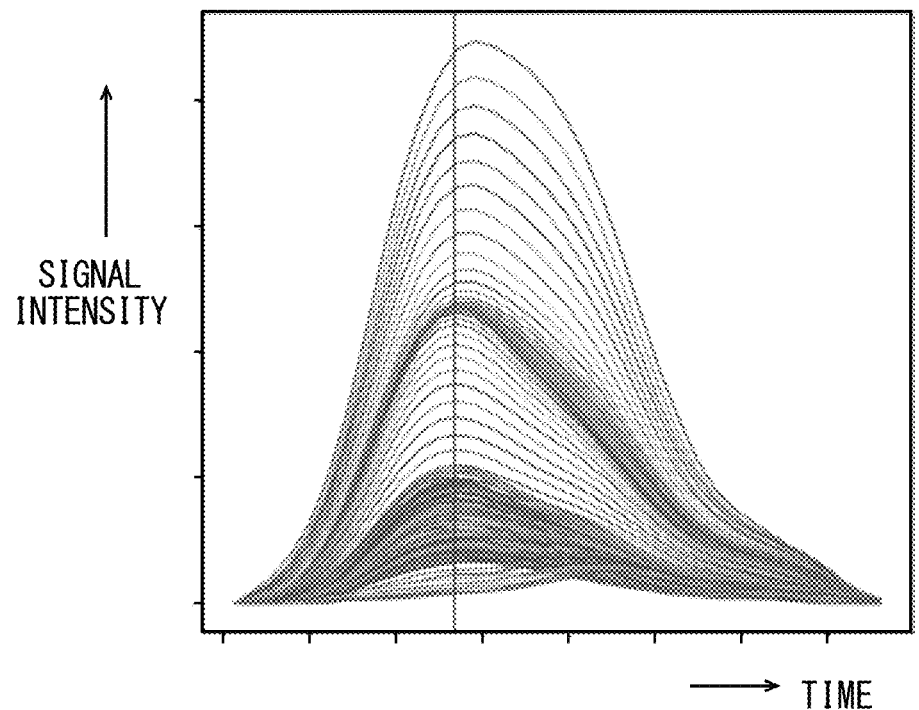
FIGS. 12A and 12B are diagrams in which the chromatograms at the respective wavelengths of the orthogonal spectral data extracted by the orthogonal spectrum extractor are overlapped.
Figure 12B:
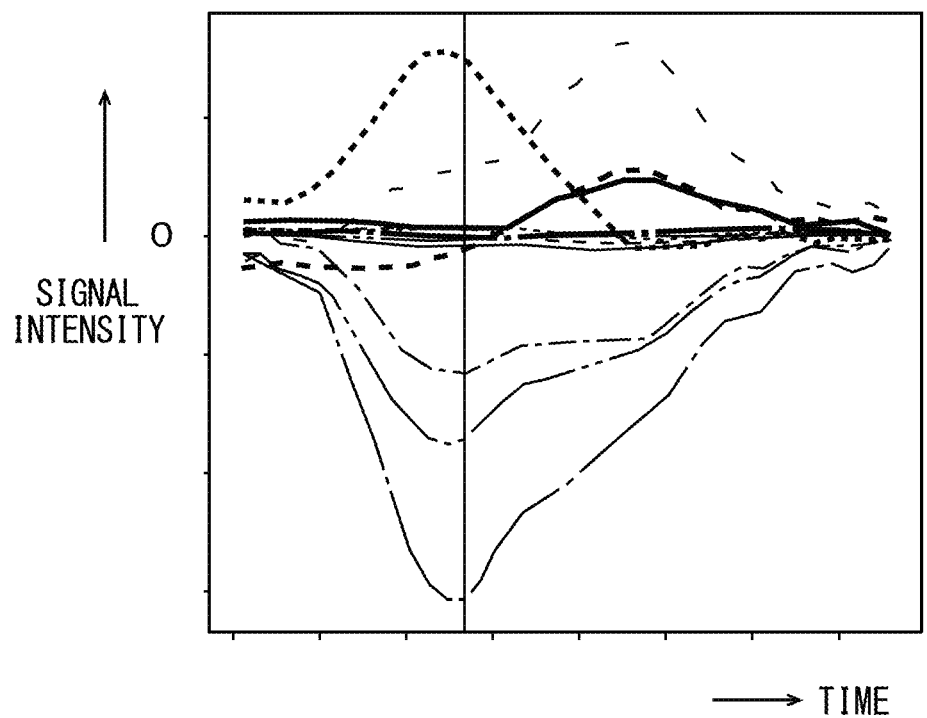

FIGS. 12A and 12B are diagrams showing an example of orthogonal spectral data RSD extracted by the orthogonal spectrum extractor 207. FIG. 12A is a diagram in which the chromatograms at the respective wavelengths of the orthogonal spectral data RSD extracted by the orthogonal spectrum extractor 207 are overlapped. FIG. 12B is a diagram in which the orthogonal spectral data RSD of FIG. 12A is dimensionally contracted. With reference to FIG. 12A, the peaks appear to be a single peak. However, with reference to FIG. 12B, it is seen that there are slightly shifted peaks A and B. The shape of the peak A included in the peak C and that of the independent peak A are roughly the same. Thus, it may be checked that if the chromatogram of the orthogonal spectral data RSD of the peak A is shifted in the time direction and overlaps the chromatogram of the peak B to optimize the shifted amount, the chromatogram of the peak A coincides with that of the peak C. Such a checking processing requires a large amount of calculation, but can reduce the possibility of erroneously determining that the peaks coincide with each other.

The computer 1 may output the information as to the mixing possibility of peaks to another device, another program, another process or the like. For example, the computer 1 may output the information as to the mixing possibility of peaks to a device that executes a processing aiming at AQBD (Analytical Quality by Design). In this case, the controller 200 of the computer 1 further includes an outputter in addition to the functional block shown in FIG. 2.

For example, there is a program or a device that performs regression analysis of a retention time and resolution of a peak to acquire a design space for the retention time and the resolution. The information as to the peak mixing possibility calculated in the present embodiment may be output to the program or device that processes the design space. For example, in the device that inputs the information as to the peak mixing possibility, information in which the design space and the peak mixing possibility are associated with each other can be presented.

(5-3) Another Configuration of Device

In the above-described embodiment, the liquid chromatograph 3 is described as the analysis device of the present invention by way of example. The present invention is also applicable to a gas chromatograph. Also, in the above-described embodiment, the case where the computer 1, which is the peak tracking device of the present embodiment is connected to the liquid chromatograph 3, which is the analysis device via the network 4 is described by way of example. In another embodiment, the computer 1 may be incorporated in the analysis device. Also, in the above-described embodiment, the case where the measurement spectral data MSD is the spectral data having the signal such as the absorbance at each wavelength is described by way of example. The present invention is also applicable to spectral data having a signal value for each m/z by use of an MS as a detector.

(5-4) Method of Providing Program

In the above-described embodiment, the case where the peak tracking program P1 is saved in the storage device 106 is described by way of example. In another embodiment, the peak tracking program P1 may be saved in the storage medium 109 for provision. The CPU 101 may access the storage medium 109 via the device interface 108 and may save the peak tracking program P1 saved in the storage medium 109 in the storage device 106 or the ROM 103. Alternatively, the CPU 101 may access the storage medium 109 via the device interface 108 to execute the peak tracking program P1 saved in the storage medium 109.

The specific configuration of the present invention is not limited to the above-described embodiments, and various variations and modifications may be made without departing the scope of the present invention.

(6) Aspects

It is understood by those skilled in the art that the plurality of above-mentioned illustrative embodiments are specific examples of the below-mentioned aspects.

(Item 1)

A peak tracking device according to one embodiment of the present invention includes a chromatogram acquirer that acquires chromatograms based on a plurality of measurement data obtained by providing an analysis device with a plurality of analysis condition data, and a peak associator that associates each peak included in each chromatogram with one another, wherein the peak associator includes a peak spectrum extractor that extracts peak spectral data being a spectrum derived from a peak from measurement spectral data acquired from each measurement data, an orthogonal spectrum extractor that extracts, from the measurement spectral data, spectral data orthogonal to a dominant component among components of the peak spectral data, and a similarity determiner that associates each peak with one another based on similarity of the spectral data extracted from the orthogonal spectrum extractor.

With the peak tracking device of item 1, the peaks included in the chromatograms can be identified.

(Item 2)

In the peak tracking device according to item 1, the peak associator may include a baseline spectrum extractor that extracts, from the measurement spectral data acquired from each measurement data, baseline spectral data being a spectrum derived from a baseline, and the orthogonal spectrum extractor may extract, from each measurement spectral data, spectral data orthogonal to the baseline spectral data.

An influence exerted by a baseline fluctuation component can be eliminated, and identification of peaks can be effectively carried out.

(Item 3)

In the peak tracking device according to item 1 or 2, the peak spectrum extractor may include a peak region specifier that specifies a peak region by applying a secondary differential filter or a highpass filter to each chromatogram, a baseline estimator that estimates a baseline based on the specified peak region, and a baseline remover that removes the baseline from the measurement spectral data.

The influence exerted by the baseline fluctuation component can be eliminated by removing the baseline.

(Item 4)

In the peak tracking device according to any one of items 1 to 3, the orthogonal spectrum extractor may acquire the dominant component by performing singular value decomposition of the peak spectral data.

The dominant component of the peak spectral data can be acquired by the singular value decomposition. Thus, the peak tracking device can effectively perform identification of peaks using a component other than the dominant component of the peak spectral data.

(Item 5)

In the peak tracking device according to any one of items 1 to 3, the orthogonal spectrum extractor may acquire the dominant component using an average value in a time direction of the peak spectral data.

The dominant component of the peak spectral data can be acquired using the average value. Thus, the peak tracking device can effectively perform the identification of peaks using the component other than the dominant component of the peak spectral data.

(Item 6)

The peak tracking device according to any one of items 1 to 5 may further include a spectrum display that dimensionally contracts the spectral data extracted by the orthogonal spectrum extractor to display the contracted spectral data on a display.

A user can visually check validity of determination of similarity of peaks made by the peak tracking device.

(Item 7)

In the peak tracking device according to any one of items 1 to 6, information indicating that the spectral data extracted from the orthogonal spectrum extractor is included in a hyperplane spanned by spectral data derived from a plurality of substances may be provided as information as to mixing possibility of peaks.

The possibility of mixing peaks can be provided to the user.

(Item 8)

A peak tracking device according to another embodiment of the present invention includes
- a chromatogram acquirer that acquires chromatograms based on a plurality of measurement data obtained by providing an analysis device with a plurality of analysis condition data, and
- a peak associator that associates each peak included in each chromatogram with one another,
- wherein the peak associator includes
- a baseline spectrum extractor that extracts, from measurement spectral data acquired from each measurement data, baseline spectral data being a spectrum derived from a baseline,
- an orthogonal spectrum extractor that extracts, from each measurement spectral data, spectral data orthogonal to the baseline spectral data, and
- a similarity determiner that associates each peak with one another based on similarity of the spectral data extracted from the orthogonal spectrum extractor.

Identification of peaks can be carried out by eliminating a component orthogonal to the baseline.

(Item 9)

A peak tracking method according to another embodiment of the present invention includes
- a chromatogram acquiring step of acquiring chromatograms based on a plurality of measurement data obtained by providing an analysis device with a plurality of analysis condition data, and
- a peak associating step of associating each peak included in each chromatogram with one another,
- wherein the peak associating step includes
- a peak spectrum extracting step of extracting peak spectral data being a spectrum derived from a peak from measurement spectral data acquired from each measurement data,
- an orthogonal spectrum extracting step of extracting, from the measurement spectral data, spectral data orthogonal to a dominant component among components of the peak spectral data, and
- a similarity determining step of associating each peak with one another based on similarity of the orthogonal spectral data extracted from the orthogonal spectrum extracting step.

With the peak tracking method of item 9, the peaks included in the chromatograms can be identified.

(Item 10)

A non-transitory computer readable medium according to another embodiment of the present invention stores a peak tracking program causing a computer to execute:
- a processing of acquiring chromatograms based on a plurality of measurement data obtained by providing an analysis device with a plurality of analysis condition data, and
- a processing of associating each peak included in each chromatogram with one another by extracting peak spectral data being a spectrum derived from a peak from measurement spectral data acquired from each measurement data, extracting, from the measurement spectral data, spectral data orthogonal to a dominant component among components of the peak spectral data, and associating each peak with one another based on similarity of the extracted orthogonal spectral data.

With the peak tracking program of item 10, the peaks included in the chromatograms can be identified.

The invention claimed is:

1. A peak tracking device comprising:
   a chromatogram acquirer that acquires chromatograms based on a plurality of measurement data obtained by providing an analysis device with a plurality of analysis condition data; and
   a peak associator that associates each peak included in each chromatogram with one another,
   wherein the peak associator includes
      a peak spectrum extractor that extracts peak spectral data being a spectrum derived from a peak from measurement spectral data acquired from each measurement data,
      an orthogonal spectrum extractor that extracts, from the measurement spectral data, spectral data orthogonal to a dominant component among components of the peak spectral data, and
      a similarity determiner that associates each peak with one another based on similarity of the spectral data extracted by the orthogonal spectrum extractor, and
   wherein the dominant component is one of a first principal component among spectrums obtained by performing singular value decomposition of the peak spectral data and an average value in a time direction of the peak spectral data.

2. The peak tracking device according to claim 1, wherein the peak associator includes a baseline spectrum extractor that extracts, from the measurement spectral data acquired from each measurement data, baseline spectral data being a spectrum derived from a baseline, and
   the orthogonal spectrum extractor extracts, from each measurement spectral data, spectral data orthogonal to the baseline spectral data.

3. The peak tracking device according to claim 1, wherein the peak spectrum extractor includes
   a peak region specifier that specifies a peak region by applying a secondary differential filter or a highpass filter to each chromatogram,
   a baseline estimator that estimates a baseline based on the specified peak region, and
   a baseline remover that removes the baseline from the measurement spectral data.

4. The peak tracking device according to claim 1, further comprising
   a spectrum display that dimensionally contracts the spectral data extracted by the orthogonal spectrum extractor to display the contracted spectral data on a display.

5. The peak tracking device according to claim 1, wherein information indicating that the spectral data extracted by the orthogonal spectrum extractor is included in a hyperplane spanned by spectral data derived from a plurality of substances is provided as information as to mixing possibility of peaks.

6. A peak tracking device comprising:
   a chromatogram acquirer that acquires chromatograms based on a plurality of measurement data obtained by providing an analysis device with a plurality of analysis condition data; and
   a peak associator that associates each peak included in each chromatogram with one another, wherein the peak associator includes
- a baseline spectrum extractor that extracts, from measurement spectral data acquired from each measurement data, baseline spectral data being a spectrum derived from a baseline, and
- an orthogonal spectrum extractor that extracts, from each measurement spectral data, spectral data orthogonal to the baseline spectral data, and
- a similarity determiner that associates each peak with one another based on similarity of the spectral data extracted by the orthogonal spectrum extractor.

7. A peak tracking method comprising:
a chromatogram acquiring step of acquiring chromatograms based on a plurality of measurement data obtained by providing an analysis device with a plurality of analysis condition data; and
a peak associating step of associating each peak included in each chromatogram with one another,
wherein the peak associating step includes
- a peak spectrum extracting step of extracting peak spectral data being a spectrum derived from a peak from measurement spectral data acquired from each measurement data,
- an orthogonal spectrum extracting step of extracting, from the measurement spectral data, spectral data orthogonal to a dominant component among components of the peak spectral data, and
- a similarity determining step of associating each peak with one another based on similarity of the orthogonal spectral data extracted by the orthogonal spectrum extracting step, and
wherein the dominant component is one of a first principal component among spectrums obtained by performing singular value decomposition of the peak spectral data and an average value in a time direction of the peak spectral data.

8. A non-transitory computer readable medium storing a peak tracking program causing a computer to execute:
- a processing of acquiring chromatograms based on a plurality of measurement data obtained by providing an analysis device with a plurality of analysis condition data; and
- a processing of associating each peak included in each chromatogram with one another by extracting peak spectral data being a spectrum derived from a peak from measurement spectral data acquired from each measurement data, extracting, from the measurement spectral data, spectral data orthogonal to a dominant component among components of the peak spectral data, and associating each peak with one another based on similarity of the extracted orthogonal spectral data,
wherein the dominant component is one of a first principal component among spectrums obtained by performing singular value decomposition of the peak spectral data and an average value in a time direction of the peak spectral data.

* * * * *